United States Patent
West

(10) Patent No.: US 9,595,830 B2
(45) Date of Patent: Mar. 14, 2017

(54) HIGHLY STABLE MAXIMUM POWER POINT TRACKING FOR BIPOLAR PHOTOVOLTAIC INVERTERS

(71) Applicant: Richard Travis West, Ragged Point, CA (US)

(72) Inventor: Richard Travis West, Ragged Point, CA (US)

(73) Assignee: RENEWABLE POWER CONVERSION, INC., San Luis Obispo, CA (US)

( * ) Notice: Subject to any disclaimer, the term of this patent is extended or adjusted under 35 U.S.C. 154(b) by 884 days.

(21) Appl. No.: 13/940,214

(22) Filed: Jul. 11, 2013

(65) Prior Publication Data

US 2015/0016168 A1    Jan. 15, 2015

(51) Int. Cl.
*H02M 7/5387* (2007.01)
*H02J 3/38* (2006.01)
*H02M 7/5395* (2006.01)

(52) U.S. Cl.
CPC ............... *H02J 3/385* (2013.01); *H02J 3/383* (2013.01); *H02M 7/5395* (2013.01); *H02M 7/53871* (2013.01); *Y02E 10/563* (2013.01); *Y02E 10/58* (2013.01)

(58) Field of Classification Search
CPC ... H02J 3/383; H02J 3/385; H02J 3/38; Y02E 10/563; Y02E 10/58; H02M 2001/007; H02M 7/53871; H02M 7/5395; Y10T 307/707; G05F 1/66; G05F 1/67
See application file for complete search history.

(56) References Cited

U.S. PATENT DOCUMENTS

| 7,319,313 | B2* | 1/2008 | Dickerson | H02J 7/35 323/285 |
| 7,710,752 | B2* | 5/2010 | West | H02M 1/12 323/906 |
| 8,618,456 | B2* | 12/2013 | Hinman | H02H 7/1222 250/203.4 |
| 8,625,315 | B2* | 1/2014 | Erdman | H02M 7/53875 363/41 |
| 8,648,497 | B2* | 2/2014 | Stern | H02M 7/5387 307/82 |
| 2010/0110742 | A1* | 5/2010 | West | H02H 3/16 363/132 |
| 2010/0195361 | A1* | 8/2010 | Stem | H02M 7/5387 363/132 |
| 2012/0019964 | A1* | 1/2012 | West | H02H 7/205 361/42 |

* cited by examiner

*Primary Examiner* — Michael Zarroli

(57) ABSTRACT

The invention is a method of tracking the overall maximum power point of a grounded bipolar photovoltaic array by tracking and regulating the voltage of the weaker of the two monopolar subarrays at any instant in time. The transfer between subarrays being tracked for the maximum power point is seamless when the voltage of one subarray becomes lower than the other. This tracking method insures stable operation and maximum power transfer under all balanced and unbalanced PV array conditions. This tracking algorithm would typically be part of a larger digital power converter control system.

6 Claims, 2 Drawing Sheets

US 9,595,830 B2

HIGHLY STABLE MAXIMUM POWER POINT TRACKING FOR BIPOLAR PHOTOVOLTAIC INVERTERS

BACKGROUND OF THE INVENTION

Photovoltaic (PV) sources have characteristic current verses voltage curves. At low currents, a PV source behaves like a non-ideal voltage source. At high currents, a PV source behaves like a non-ideal current source. At some point in between, maximum power can be delivered from a PV source. The maximum power of the PV source is a function of the level of solar radiation, typically specified in Watts per square meter and the temperature of the PV source, typically specified as the PV module cell temperature. Essentially all photovoltaic power converters dynamically track the composite maximum power point of a number of connected solar PV modules. The process is done with a perturb-and-observe algorithm wherein a PV voltage is set and regulated by adjusting the load on the PV source and the power is observed. The PV voltage is then adjusted slightly and the power is again observed, if the power increases as a result of the PV voltage change, the PV voltage is again adjusted in the same direction, if not the PV voltage is incremented in the opposite direction until the PV maximum power point is captured and the PV voltage is dithered about the PV maximum power point voltage. The tracking is dynamic in order to track rapid changes in radiation due to, for example, fast moving cloud cover.

When the maximum power point of a grounded bipolar PV array is tracked by regulating the pole-to-pole voltage of the array, there will be stability issues when the available power from the monopolar subarrays becomes imbalanced. With a grid-interactive inverter, if the positive subarray is partially shadowed and the negative subarray is in full sun, the voltage on the partially shadowed, positive array will become less than the positive peak voltage of the connected electrical grid, the positive DC inverter bus will collapse and the inverter will shut down.

BRIEF SUMMARY OF THE INVENTION

The invention is a method of tracking the overall maximum power point of a grounded bipolar photovoltaic array by tracking and regulating the voltage of the weaker of the two monopolar subarrays at any instant in time. The transfer between subarrays being tracked for the maximum power point is seamless when the voltage of one subarray becomes lower than the other. This tracking method insures stable operation and maximum power transfer under all balanced and unbalanced PV array conditions. This tracking algorithm would typically be part of a larger digital power converter control system.

DETAILED DESCRIPTION OF THE INVENTION

Figure 1:
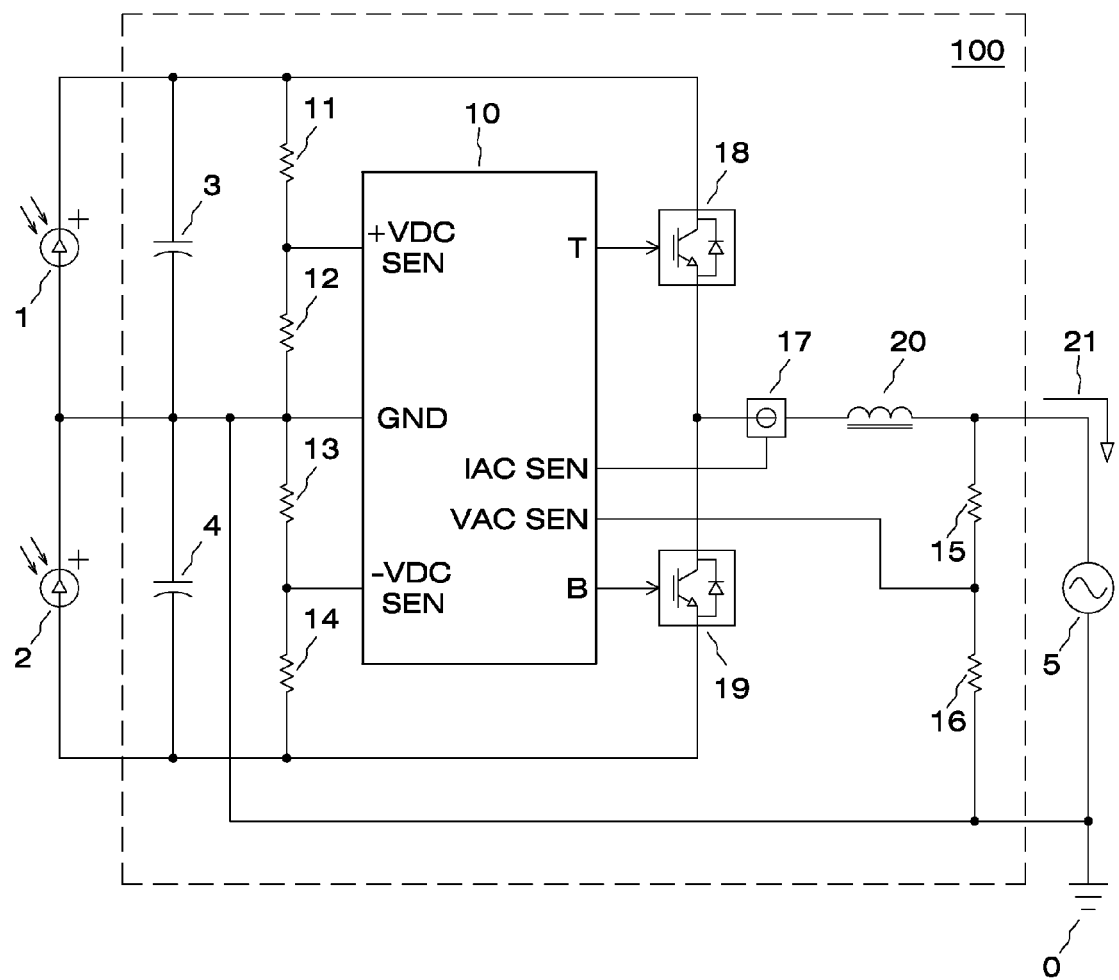
FIG. 1 is an electrical schematic of a simple grid-interactive, bipolar photovoltaic to single-phase power conversion system intended to be used as a reference for FIG. 2.

FIG. 1 is a simplified electrical schematic of a grid-interactive, photovoltaic to single-phase power converter and power system. Power is converted by power converter 100 from solar photovoltaic sources 1 and 2. Electric power grid 5 is a 60 Hz sinusoidal voltage source. Power converter 100 regulates sinusoidal current 21 in phase with electric power grid 5 voltage to achieve positive power transfer into electric power grid 5. Photovoltaic sources 1 and 2 are collectively configured as a bipolar source having both positive and negative voltage potentials with respect to common system ground point 0. Electric power grid 5 is also referenced to common system ground point 0. In most applications where power is converted from a bipolar photovoltaic source, a three-phase power converter (inverter) will be used. For this example, a single-phase inverter is discussed for simplicity.

In FIG. 1, DC bus capacitors 3 and 4 are connected in parallel with photovoltaic sources 1 and 2, respectively, to provide a low AC impedance for the half bridge semiconductor switching matrix configured from IGBT/diode combination 18 and IGBT/diode combination 19. Control circuit 10 has four inputs, (i) positive DC voltage sense, +VDC SEN, which reads the voltage of photovoltaic source 1 with respect to system ground point 0 by way of a voltage divider configured from resistors 11 and 12, (ii) negative DC voltage sense, −VDC SEN, which reads the voltage of photovoltaic source 2 with respect to system ground point 0 by way of a voltage divider configured from resistors 13 and 14, (iii) AC line voltage sense, VAC SEN, which reads the voltage of electric power grid source 5 with respect to system ground point 0 by way of a voltage divider configured from resistors 15 and 16 and (iv) AC line current 21, shown with a positive sense into electric power grid 5, IAC SEN, is provided by current sensor 17. The control circuit ground is shown as GND. Control circuit 10 has two outputs, T, a drive to switch top IGBT 18 on and off and B, a drive to switch bottom IGBT 19 on and off. The common point of this half bridge semiconductor switching matrix is connected through inductor 20. Other semiconductor power switch types could be substituted for IGBTs 18 and 19. The circuit in FIG. 1 is shown for reference and is not considered novel. Typically, other capacitive and inductive line filter components will be included as secondary filter elements. Drives T and B are driven as complements, wherein both are never "on" at the same time.

Figure 2:
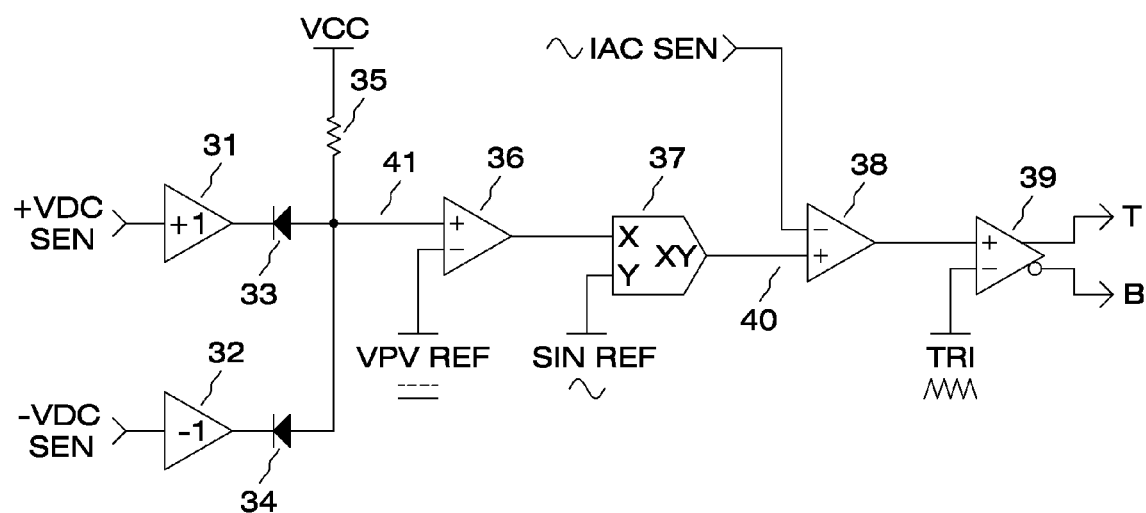
FIG. 2 is a simplified schematic of an analog circuit illustrating the invention.

FIG. 2 shows a simplified analog circuit equivalent of the invention control method. In almost all applications the regulation method according to the invention will be implemented with digital controls. The circuit shown in FIG. 2 can all be considered within control circuit block 10 in FIG. 1. FIG. 1 and FIG. 2 have some common reference characters to purposefully link the two drawings. The FIG. 2 discussion herein will refer back to FIG. 1 when required to explain full functionality of the invention.

In FIG. 2, scaled positive monopole voltage with respect to ground +VDC SEN is applied to the input of buffer amplifier 31. Buffer amplifier 31 has a gain of +1. Scaled negative monopole voltage with respect to ground −VDC SEN is applied to the input of inverting buffer amplifier 32. Inverting buffer amplifier 32 has a gain of −1. The outputs of buffer amplifiers 31 and 32 are connected to the cathodes of precision rectifiers 33 and 34 respectively. The anodes of precision rectifiers 33 and 34, a first terminal of pull-up resistor 35 and the non-inverting input of error amplifier 36 are connected together. A second terminal of pull-up resistor 35 is connected to positive control supply VCC. Error amplifier 36 is part of a servo loop which regulates 41, the absolute value of the voltage of the lower of +VDC SEN and −VDC SEN, to PV voltage regulation reference value VPV REF. The output of error amp 36 is connected to the X input of multiplier 37. The Y input of multiplier 37 is connected to SIN REF, a fixed amplitude sine wave synchronized with VAC SEN in FIG. 1. The output of multiplier circuit 37 is a variable amplitude sinewave 40, the AC current reference, which is connected to the non-inverting terminal of error amplifier 38. The inverting input of error amplifier 38 is connected to feedback signal IAC SEN. Error amplifier 38 regulates feedback current IAC SEN to match AC current reference 40. The output of error amplifier 38 is connected to the non-inverting input of comparator 39. The inverting input of comparator 39 is connected to triangle wave TRI. TRI runs at the pulse width modulation (PWM) frequency and is "beat" against the output of error amplifier 38 to provide the complementary comparator 39 outputs as PWM drive pulses for IGBT drives T and B as referenced in both FIGS. 1 and 2.

In FIG. 2, voltage regulation is accomplished with a perturb-and-observe algorithm wherein a VPV REF is set and the lower voltage subarray voltage is regulated by adjusting the load on the PV source by increasing or decreasing IAC REF 40 and by observing the overall inverter output power. VPV REF is then adjusted slightly and the overall inverter power is again observed, if the power increases as a result of the VPV REF change, the VPV REF is again adjusted in the same direction, if not VPV REF is incremented in the opposite direction until the PV source maximum power point is captured and the PV source voltage is dithered about the PV source maximum power point voltage.

The circuit function illustrated in FIG. 2 is not novel with the exception of the arrangement of elements 31, 32, 33, 34 and 35 which provide a seamless transfer with respect to which subarray is being regulated to VPV REF according to which subarray has the lowest voltage at any point in time. Under normal operating conditions, the current through both subarrays, elements 1 and 2 in FIG. 1, will be the same. Therefore, the subarray with the lower voltage will be the weaker subarray or, restated, the subarray with the lower available power.

In practice, digital control will be used wherein the voltages of both PV monopoles will be signal conditioned and applied to analog-to-digital converter inputs. The two resultant digital numerical values will be compared and the subarray with the lower value at any point in time will be regulated to an internal numerical VPV REF value. The data from the subarray not being voltage regulated, at any point in time, will not be used to track the maximum power point but may be used to detect over and under voltage fault conditions.

What I claim as my invention is:

1. A method for establishing the maximum power point of a bipolar photovoltaic array by determining the available power of each of two monopolar subarrays that comprise the bipolar photovoltaic array, by determining which of said monopolar subarrays has the lower available power and by actively tracking the maximum power point of the monopolar subarray having the lower available power.

2. A method for establishing the maximum power point of a bipolar photovoltaic array according to claim 1 wherein the monopolar subarray with the lower available power is determined by measuring the voltage across each monopolar subarray, by comparing the voltages of the two monopolar subarrays and by actively tracking the maximum power point of the monopolar subarray having the lower voltage at any instant in time.

3. A method for establishing the maximum power point of a bipolar photovoltaic array, according to claim 1, wherein said bipolar photovoltaic array comprises two monopolar subarrays and wherein a first monopolar subarray is grounded to provided positive DC voltage potentials with respect to earth ground and wherein a second monopolar subarray is grounded to provide negative DC voltage potentials with respect to earth ground.

4. A method for establishing the maximum power point of a bipolar photovoltaic array according to claim 2 wherein said process of actively tracking the maximum power point includes regulating the voltage of said subarray having the lower available power to match or follow a DC reference voltage.

5. A method for establishing the maximum power point of a bipolar photovoltaic array according to claim 2 wherein said process of actively tracking the maximum power point includes regulating the voltage of said monopolar subarray having the lower available power to match or follow a variable DC reference voltage and wherein said variable DC reference voltage is perturbed so that a change in power can be observed so that power can be maximized.

6. A method for establishing the maximum power point of a bipolar photovoltaic array according to claim 5, wherein said variable DC reference voltage is continually perturbed so that a resultant change in power can be observed so that power can maximized under dynamic conditions with respect to movement of the maximum power point of said bipolar photovoltaic array.

\* \* \* \* \*